(12) United States Patent
Cooper et al.

(10) Patent No.: US 9,943,710 B1
(45) Date of Patent: Apr. 17, 2018

(54) PUSH LOCKING LOAD ATTACHMENT DEVICE

(71) Applicant: The United States of America, as represented by the Secretary of the Air Force, Washington, DC (US)

(72) Inventors: Cory Alan Cooper, Monument, CO (US); Darren Craig Tidwell, Huntsville, UT (US); Garrett Fritzsche, Monument, CO (US); Christopher Yooshin Jang, Colorado Springs, CO (US); Brock M. Flieger, Colorado Springs, CO (US); Alan James Vaillencourt, Cookeville, TN (US); Miranda Leigh Bray, Colorado Springs, CO (US); Shane Michael Riley, Sheppard AFB, TX (US); Nathanael Jordan Szuch, SAAFB, TX (US)

(73) Assignee: The United States of America As represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 15/487,833

(22) Filed: Apr. 14, 2017

(51) Int. Cl.
*A62B 1/06* (2006.01)
*A63B 29/00* (2006.01)
*F16B 45/06* (2006.01)

(52) U.S. Cl.
CPC ............... *A62B 1/06* (2013.01); *A63B 29/00* (2013.01); *F16B 45/06* (2013.01)

(58) Field of Classification Search
CPC ..... A62B 1/06; A62B 35/0025; A62B 35/0068; A63B 29/00; F16B 45/06
See application file for complete search history.

(56) References Cited

U.S. PATENT DOCUMENTS

| 31,946 A | 4/1861 | Beagle, Jr. |
| 57,456 A | 8/1866 | Alyson |
| 184,211 A | 11/1876 | Jones |
| 217,942 A | 7/1879 | Hayden |
| 340,558 A | 4/1886 | Converse |
| 346,811 A | 8/1886 | Drew |
| 550,189 A | 11/1895 | Melka |
| 641,316 A | 1/1900 | Meyer |

(Continued)

FOREIGN PATENT DOCUMENTS

| CA | 2415874 | 7/2004 |
| CN | 100343154 | 10/2007 |

(Continued)

*Primary Examiner* — Anita M King
(74) *Attorney, Agent, or Firm* — AFMCLO/JAZ; Timothy Barlow

(57) ABSTRACT

An attachment device for installation onto a support, includes a pair of oppositely facing and laterally offset hooks rotatably mounted so as to be oppositely facing and laterally offset from one another; a stop defined on one of the hooks and located so that the other one of the hooks is prevented from rotating past the stop by contact with the stop; and a biasing member operatively associated with the pair of hooks for urging the hooks to rotate toward one another, and the stop limits rotation of the hooks to maintain the hooks relative to one another to define a yieldable guide that facilitates installation of the attachment device onto the support.

18 Claims, 6 Drawing Sheets

(56) References Cited

U.S. PATENT DOCUMENTS

```
    682,684  A      9/1901  Hakemeyer
    755,841  A      3/1904  Brady
  1,041,399  A     10/1912  Adams
  1,392,184  A      9/1921  Long
  1,657,087  A      1/1928  Johnston et al.
  2,211,273  A  *   8/1940  Kleckner ................ F16B 45/06
                                                         24/598.5
  4,911,394  A  *   3/1990  Ericson .................... B66C 1/34
                                                          248/301
  5,005,266  A      4/1991  Fister et al.
  9,486,655  B1 *  11/2016  London, Sr. ....... A62B 35/0018
```

FOREIGN PATENT DOCUMENTS

```
DE           3347725        12/1983
WO    WO-2014088603 A1  *    6/2014   ......... A62B 35/0037
```

\* cited by examiner

PUSH LOCKING LOAD ATTACHMENT DEVICE

GOVERNMENT INTEREST

The invention described herein may be manufactured and used by or for the Government of the United States for all governmental purposes without the payment of any royalty.

CROSS REFERENCE TO RELATED APPLICATIONS

None.

FIELD OF THE INVENTION

This invention relates to the field of attachment devices. More particularly, this invention relates to a push locking load attachment device particularly configured for use with a tethered support for a user.

BACKGROUND OF THE INVENTION

Improvement is desired in the construction of devices used in connecting a suspended load from a support location. This may include, for example, lowering users or equipment from elevated locations or ascending users or equipment to elevated locations. Improvement of such devices is desired for use in the sport of rock climbing, as well as for use in first responder and military environments. Often, two hands are required to make the necessary connection between the load and the structure associated with the support location. Additionally, users are often required to lift and hold all or a portion of the load, which may be quite heavy, while the connection is being made. This is often carried out in positions and locations that involve potential danger and that require significant effort and dexterity.

What is needed, therefore, is an attachment device for quick engagement with a support that enables the user to quickly form a connection between a support location and the load with limited engagement by the user, such as through the use of one hand, as may be required in a variety of situations and conditions.

SUMMARY OF THE INVENTION

The above and other needs are met by an attachment device configured for quick engagement with a support.

In one aspect, the device includes a hub and a pair of cooperating hooks rotatably mounted to the hub and configured to rotate between an open position for receiving the support and a closed position for retaining the support. Each hook has a sloping engagement surface and a hook surface, and a biasing member operatively associated with the attachment device for biasing the hooks toward the closed position.

The hook surfaces of the hooks cooperate to retain the support when the attachment device is engaged with the support and the hooks are in the closed position. Contacting the sloping engagement surfaces with the support with sufficient force to overcome the biasing member causes the hooks to move from the closed position to the open position so that a portion of the support slides along the engagement surfaces and is located adjacent the hook surfaces whereupon the hooks automatically return to the closed position due to the biasing member to retain the support.

In another aspect, an attachment device includes a hub and a pair of oppositely facing and laterally offset hooks rotatably mounted to the hub. Each hook has a mount mounted to the hub, a shank extending from the mount, a bend, and a tip at a terminal end of the bend opposite the shank, wherein the bend comprises an elongated exterior sloped surface, the exterior sloped surfaces of the hooks being relatively positionable by rotation of the hooks to define a V-shaped guide.

A stop is defined on one of the hooks and located so that the tip of the other one of the hooks is prevented from rotating past the stop by contact of the tip with the stop. A biasing member is operatively associated with the hooks for urging the exterior sloped surfaces of the bends of the hooks toward one another so that the exterior sloped surfaces are urged to rotate toward one another and the stop limits rotation of the exterior sloped surfaces so that the exterior sloped surfaces of the hooks are maintained in positions proximate to one another to provide the V-shaped guide.

The attachment device is installable onto the support by urging the V-shaped guide against the support and continuing to urge the exterior sloped surfaces toward the support with sufficient force to overcome the biasing member so that the tips of the hooks rotate away from one another to separate and define sufficient space therebetween for passage of the tips of the hooks past the support, with the biasing member urging the hooks to rotate toward one another after the hooks have passed the support to maintain the attachment device installed onto the support.

In another aspect, an attachment device includes a pair of oppositely facing and laterally offset hooks rotatably mounted so as to be oppositely facing and laterally offset from one another; a stop defined on one of the hooks and located so that the other one of the hooks is prevented from rotating past the stop by contact with the stop; and a biasing member operatively associated with the hooks for urging the hooks to rotate toward one another. The stop limits rotation of the hooks to maintain the hooks relative to one another to define a yieldable guide that facilitates installation of the attachment device onto the support.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION OF THE INVENTION

Figure 1:
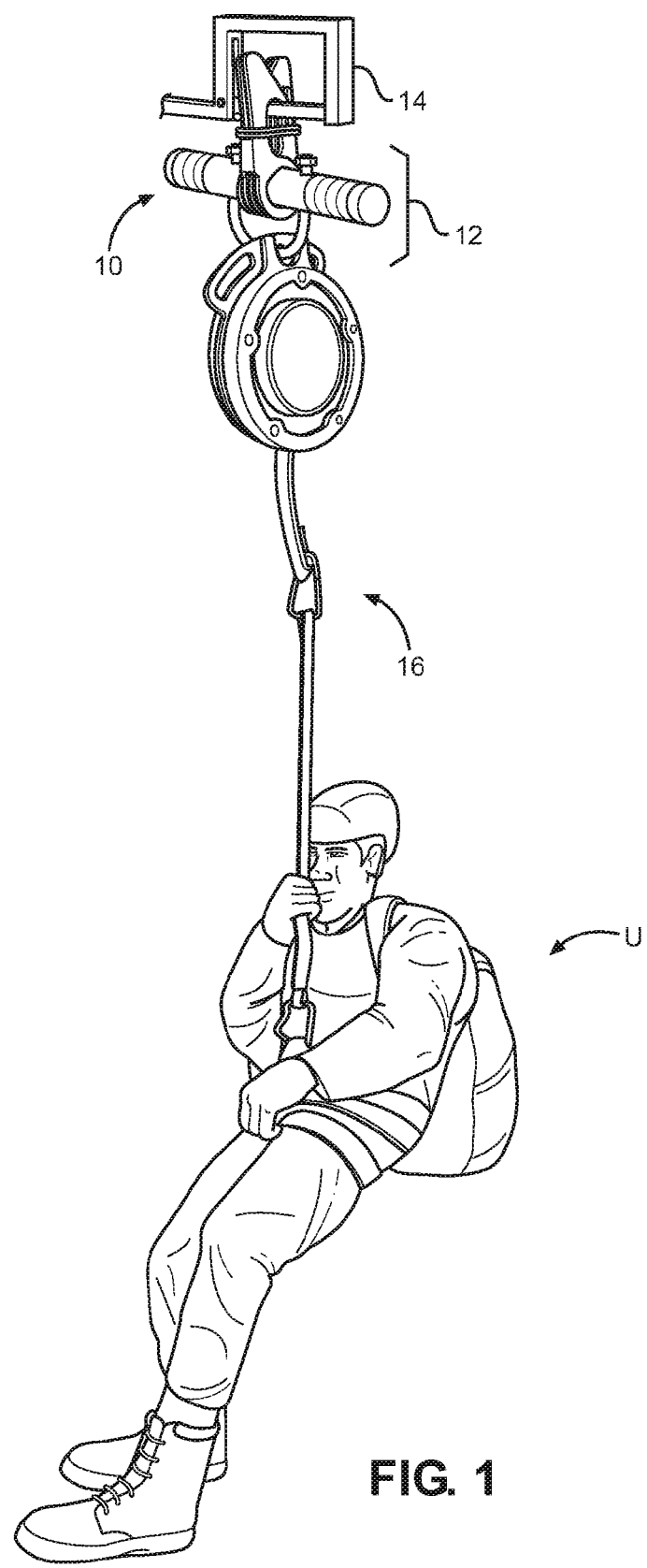
FIG. 1 depicts a push locking load attachment device according to the invention being used to support a user suspended from a belay tether.

With reference to FIG. 1 a belay system 10 is shown, which system includes a push locking load attachment device 12 mounted to an overhead support member 14 and used to support a user U suspended from a belay tether 16.

Figure 2:
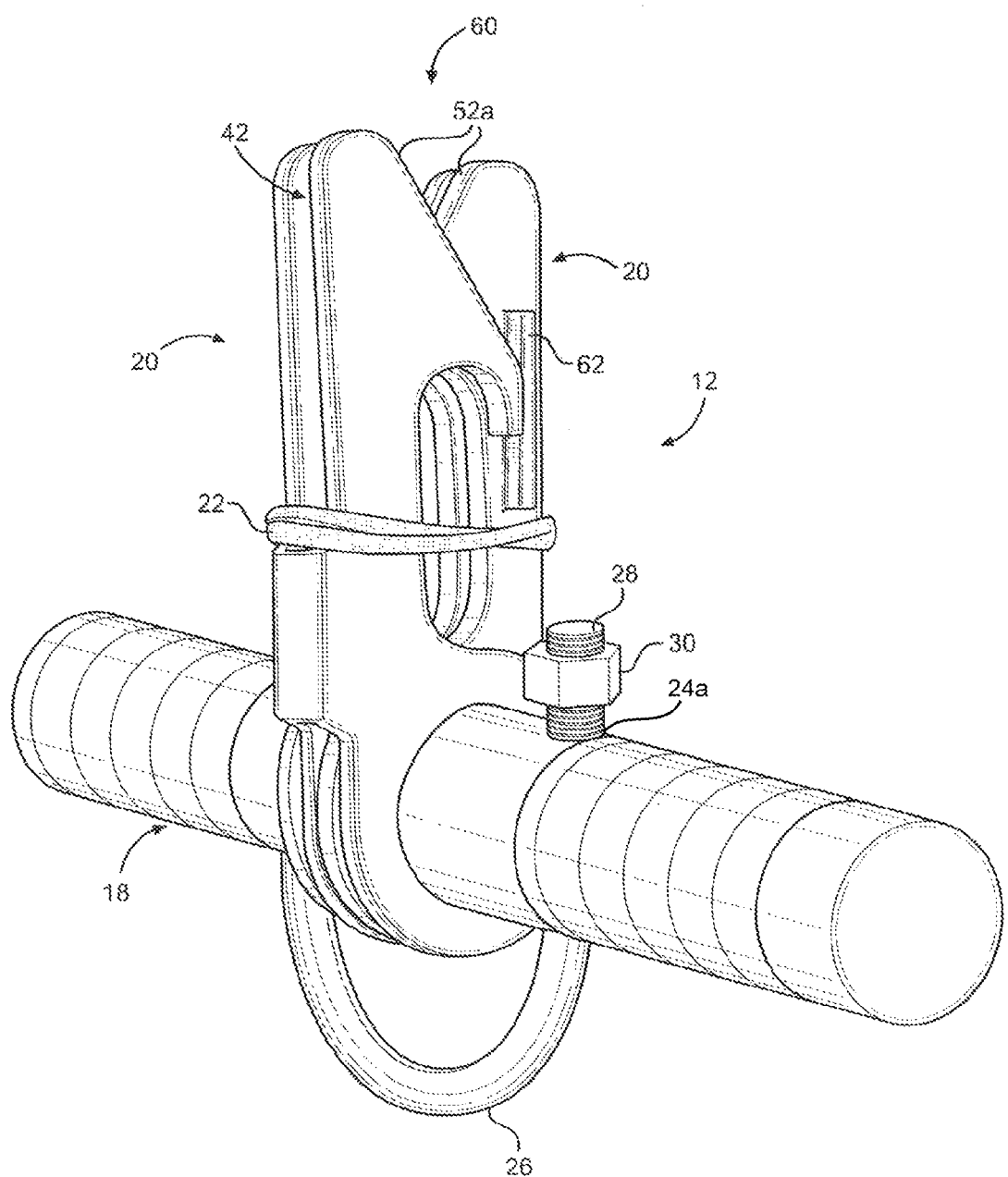
FIG. 2 depicts the push locking load attachment device according to the invention.
Figure 3:
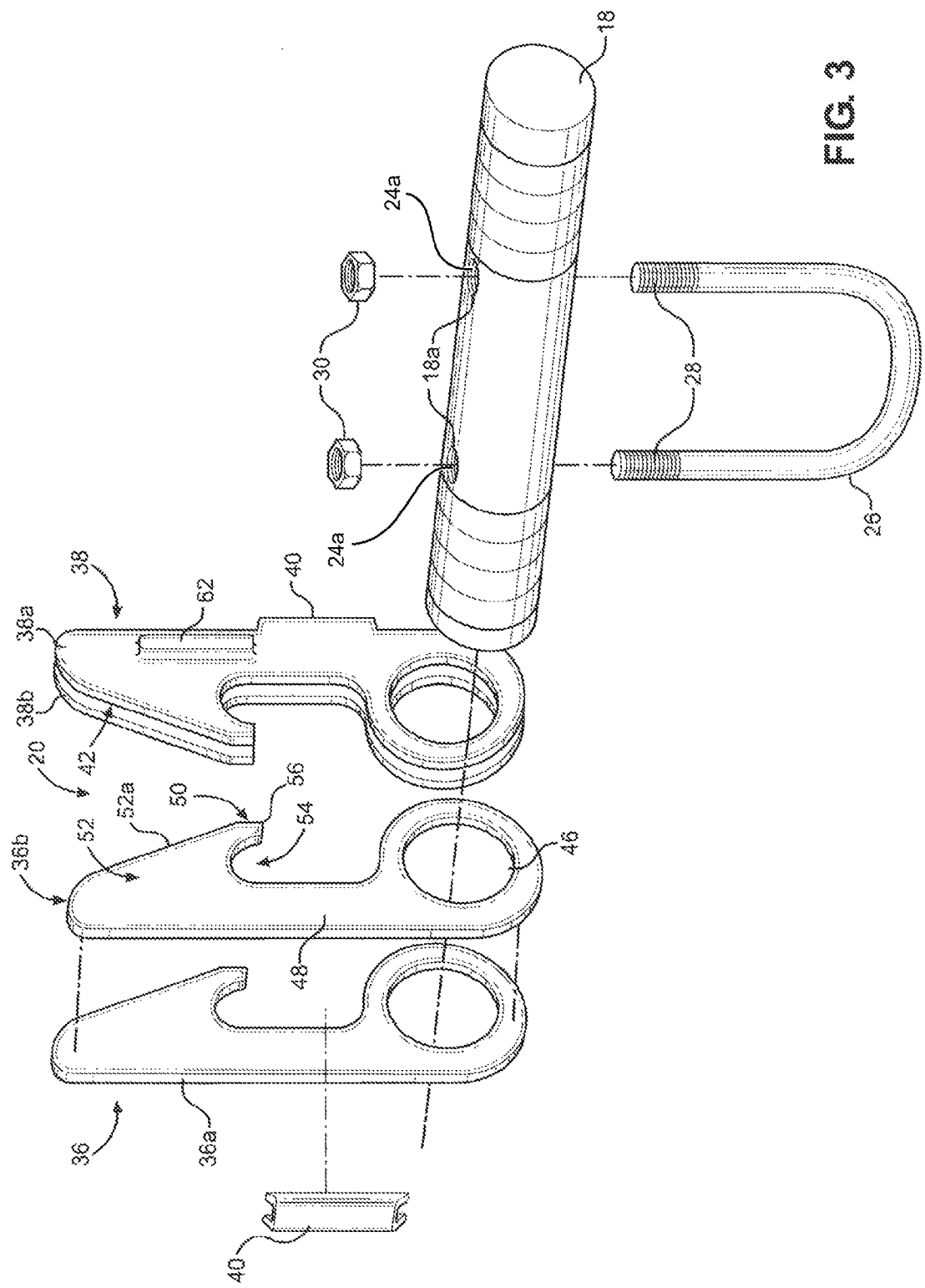
FIG. 3 is an exploded view of the push locking load attachment device of FIG. 2.

With reference to FIGS. 2 and 3, the push locking load attachment device 12 generally includes a hub 18, hook structure 20 mounted to the hub, and a biasing member 22 engaging the hook structures.

The hub 18 may be provided as by an elongate bar or other elongated member, having a U-shaped load attachment bar 26, e.g. a belay attachment structure, mounted to it. The U-shaped load attachment bar 26 may include threaded ends 28 that extend through apertures 24a of the hub 18 on either side of the hook structures 20 and are secured in place by fasteners 30, e.g. threaded fasteners. Loads, such as the belay tether and user shown in FIG. 1, may be suspended from the push locking load attachment device 12 by connecting to the load attachment bar 26.

With reference to FIG. 3, the hook structure 20 includes two or more hooks, including a first hook 36 and a second hook 38. The hooks 36 and 38 are oppositely facing and laterally offset from one another, as depicted.

The first hook 36 or the second hook 38 may each be a single hook or may be made using multiple hook members. For example, as shown, the first hook 36 includes hook members 36a and 36b, and the second hook 38 includes hook members 38a and 38b. A rigid connector 40, e.g. a joining member, positions the hook members 36a and 36b in spaced apart relation to one another so that a gap 42 is formed between them. Another rigid connector 40 holds the hook members 38a and 38b in spaced apart relation to one another so that a gap 42 is also formed between them.

It is not required that both sets of the hook members be joined together by a rigid connector 40. One pair may be joined while the other pair of hook members remains unjoined such that the individual hook members of the unjoined pair of hook members are able to rotate freely with respect to one another. In certain cases, the rigid connector 40 is a weld that joins the hook members together while, at the same time, providing a space between the hooks. The pairs of hooks 36, 38 are arranged in a meshed configuration where one of the hook members 36a or 36b of the hook 36 is inserted into the gap between the hook members 38a and 38b of the second hook 38. At the same time, one of the hook members 38a, 38b of the second hook 38 is inserted into the gap between the hook members 36a and 36b.

It will be appreciated that each of the hooks 36 and 38 may be made up of multiple hook members. For example, each of the hooks 36 and 38 may be provided by two, three, four, or more of the hook members, such as the hook members 36a and 36b and hook members 38a and 38b. In this regard, a load rating of the attachment device 12 may be determined by the number of hook members utilized for each of the hooks, and the load rating of the attachment device may be adjusted by adjusting the number of hook members utilized by each of the hooks.

Each of the hook members 36a, 36b, 38a, and 38b may be substantially identical in shape and can include a mount 46 rotatably positioned on the hub 18, a shank 48 extending away from the mount 46, and a tip 50 at a terminal end. A bend 52 having a sloping engagement surface 52a, e.g. elongate exterior sloped surface, is formed at the tip 50 and a hook surface 54 is formed opposite the shank and the sloping engagement surface 52a. The tip 50 is configured to define a projection 56 formed at the intersection of the hook surface 54 and the sloping engagement surface 52a.

Figure 4A:
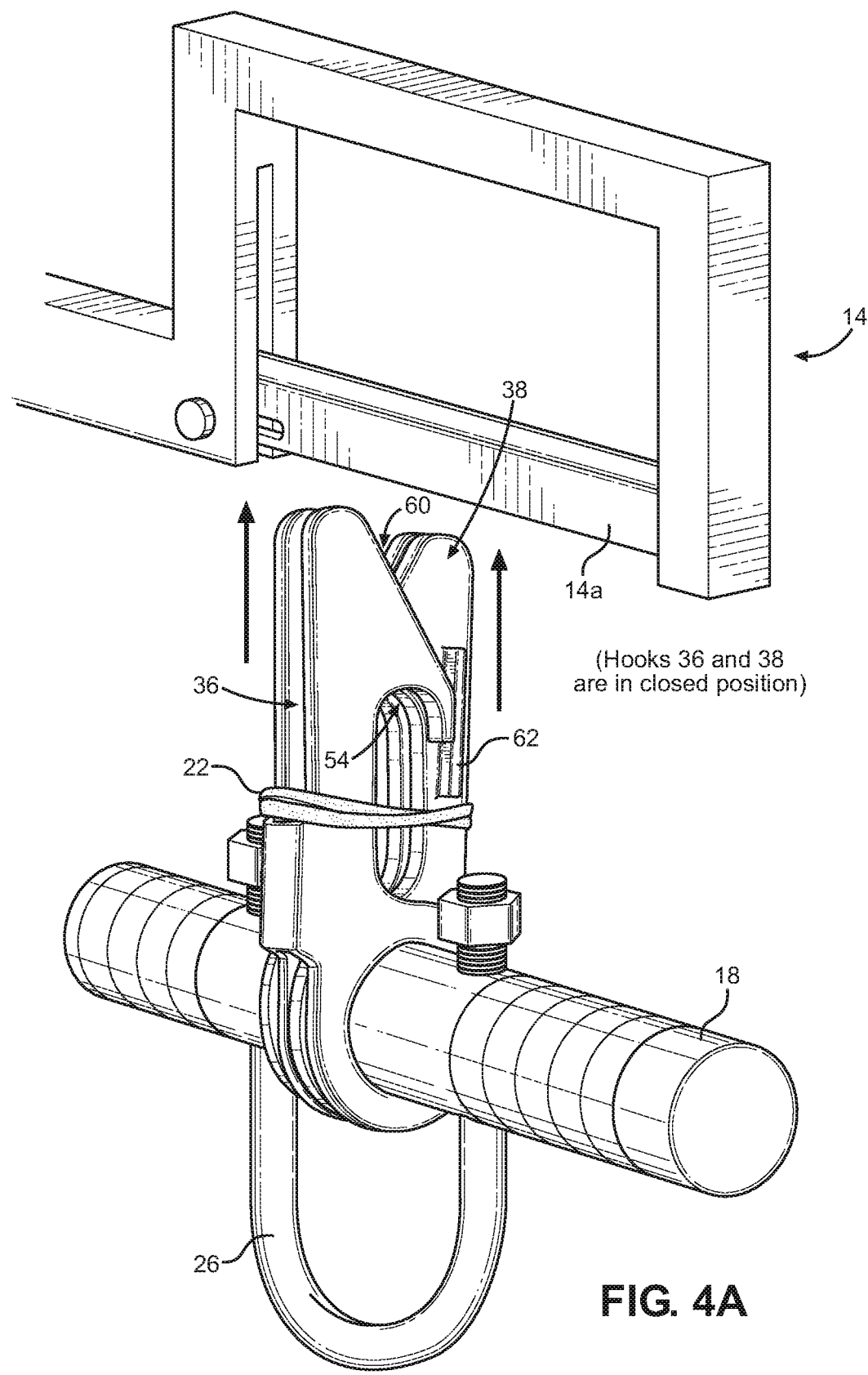
FIGS. 4A-4C depict the push locking load attachment device of FIG. 2 engaging a support.
Figure 4B:
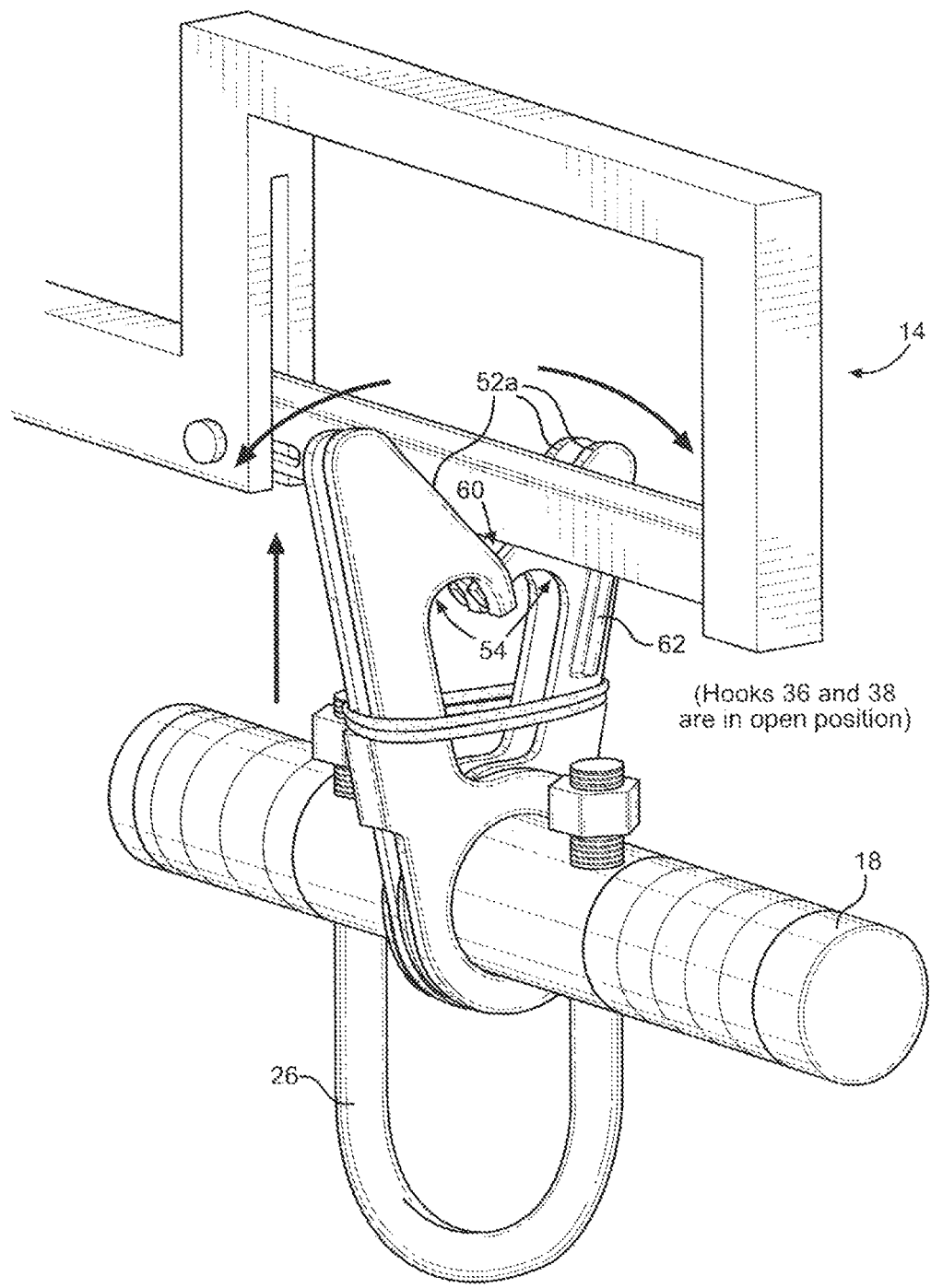
Figure 4C:
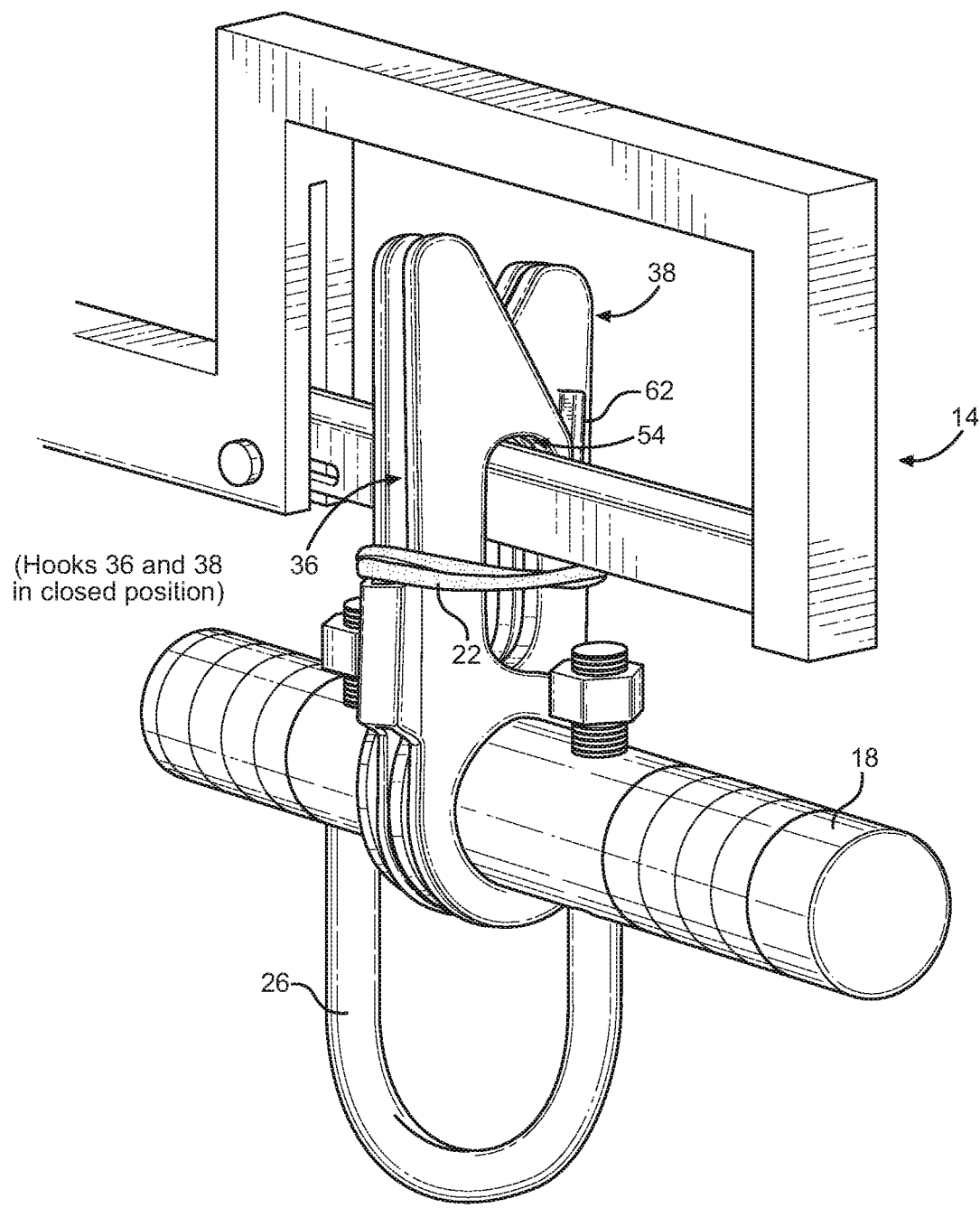

The hooks 36, 38 are rotatably mounted to the hub 18 in the meshed configuration discussed above and are configured to rotate between an open position and a closed position. FIGS. 4A and 4C represent the hooks 36 and 38 in the closed position, and FIG. 4B represents the hooks 36 and 38 in the open position.

Hook members 36a, 36b and 38a, 38b may be joined together by a joining member, such as the rigid connector 40, to rotate simultaneously with one another. This has the advantage of simplifying the rotating action and ensuring simultaneous engagement. The hooks 36, 38 are biased towards the closed position by the biasing member 22.

As shown, the biasing member 22 is an elastic band secured around the outside of the hooks 36, 38, and sized to cause the hooks 36, 38 to be automatically rotated to the closed position and firmly held in place. It will be appreciated that the biasing member 22 may be otherwise configured and provided as by springs, actuators, and other biasing members.

Due to the arrangement of the hooks 36, 38, the sloping engagement surfaces 52a of the hooks 36, 38 cooperate to define a V-shaped guide 60. One of the hooks 36 or 38 includes a rotation limiting member or stop 62, which limits the relative motion of the hooks 36 and 38 towards the closed position so that the sloping engagement surfaces 52a remain positioned to define the guide 60. For example, each of the hook members 38a and 38b preferably includes the stop 62. The provision of the V-shaped guide 60 in particular facilitates one-handed installation of the attachment device 12 onto the support 14, as depicted in FIGS. 4A-4C. That is, the V-shaped guide 60 enables the attachment device 12 to be easily oriented so that the user may quickly attach the device 12 using only one hand by simply pressing the device 12 against the support 14 as explained herein.

The attachment device 12 is installable onto the support 14 by grasping the hub 18 with one hand and urging the V-shaped guide 60 against the support 14 and continuing to urge the exterior sloped surfaces 52a that define the guide 60 toward the support 14 with sufficient force to overcome the biasing member 22 so that the tips 50 of the hook members rotate away from one another to separate and define sufficient space therebetween for passage of the tips 50 of the hook members 36a, 36b, 38a, and 38b past the support 14, with the biasing member 22 urging the hook members to rotate toward one another after the hook members have passed the support 14 to maintain the attachment device 12 installed onto the support 14.

For example, as illustrated in FIGS. 4A-4C, the push locking load attachment device 12 is designed for quick engagement with the support member 14. The support member 14 may be of a wide variety of supports associated with or attached to structures such as aircraft, buildings, trees, and rocks. The support member 14 as depicted is a fast rope insertion and extraction system (FRIES) bar of the type commonly used with military vertical lift aircraft (e.g., helicopters). The FRIES version of the support member 14 has a disengageable bar 14a that facilitates unhooking of the device 12 following its use.

In FIG. 4A, the push locking load attachment device 12 is shown in the closed position and being moved upwards but prior to actually engaging the support member 14.

In FIG. 4B, the push locking load attachment device 12 is continuing to be moved upwards. In this view, the support member 14 has contacted the sloping engagement surfaces 52a of the hooks 36, 38 so that the V-shaped guide 60 defined thereby guides the device 12 for installation onto the support 14. As will be observed in FIG. 4B, the hooks 36 and 38 are in the process of being rotated from the closed position to the open position, against the force of the biasing member 22.

In FIG. 4C, the support member 14 is securely captured by the hooks 36 and 38, and the hooks 36, 38 have automatically rotated back to the closed position in order to retain the support member 14.

After the hooks 36, 38 rotate to the closed position, the support member 14 is prevented from being removed from engagement with the hooks 36, 38 until the hooks 36, 38 are rotated to the open position. The hook surfaces 54 are formed so that applying a force to the surfaces 54 will not cause the hooks 36, 38 to rotate with respect to one another. Therefore, applying a force to the hook surfaces 54 when the hooks 36, 38 are in the closed position will not cause the hooks to rotate to the open position. This helps to prevent the support member 14 from inadvertently becoming disengaged from the push locking load attachment device 12.

The projections 56 further reduce the chances that the support member 14 is inadvertently disengaged from the push locking load attachment device 12. In the event that the hooks 36, 38 begin to rotate to the open position, the projections 56 are designed to contact the support member 14 and to halt the rotating motion of the hooks 36, 38.

As will be appreciated, the disclosure provides an attachment device for quick engagement with a support that enables the user to quickly form a connection between a support and the load with limited engagement by the user, such as through the use of one hand, as may be required in a variety of situations and conditions.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. An attachment device for quick engagement with a support, the device comprising:
    a hub;
    a pair of cooperating hooks rotatably mounted to the hub and configured to rotate between an open position for receiving the support and a closed position for retaining the support, each hook having:
    a sloping engagement surface and a hook surface wherein the hook surfaces cooperate to retain the support when the attachment device is engaged with the support and the hooks are in the closed position, and
    a biasing member operatively associated with the attachment device for biasing the hooks toward the closed position, wherein contacting the sloping engagement surfaces with the support with sufficient force to overcome the biasing member causes the hooks to move from the closed position to the open position so that a portion of the support slides along the engagement surfaces and is located adjacent the hook surfaces whereupon the hooks automatically return to the closed position due to the biasing member to retain the support, wherein at least one of the hooks comprises two or more spaced apart hooks that mesh with the opposite one of the hooks in the closed position.

2. The device of claim 1 wherein at least one of the hooks comprises two or more spaced apart hooks that are joined such that the spaced apart hooks rotate simultaneously with one another.

3. The device of claim 1 further comprising a rotation limiting member extending away from a surface of one of the hooks and positioned to contact a portion of the other one of the hooks in the closed position in order to limit relative rotation of the hooks.

4. An attachment device for installation onto a support, the attachment device comprising:
    a hub;
    a pair of oppositely facing and laterally offset hooks rotatably mounted to the hub, each hook having a mount mounted to the hub, a shank extending from the mount, a bend, and a tip at a terminal end of the bend opposite the shank, wherein the bend comprises an elongate sloping engagement surface, the sloping engagement surfaces of the hooks being relatively positionable by rotation of the hooks to define a V-shaped guide;
    a stop defined on one at least one of the hooks and located so that the tip of the other one of the hooks is prevented from rotating past the stop by contact of the tip with the stop;
    a biasing member operatively associated with the pair of hooks for urging the sloping engagement surfaces of the bends of the hooks toward one another so that the sloping engagement surfaces are urged to rotate toward one another and the stop limits rotation of the sloping engagement surfaces so that the sloping engagement surfaces of the pair of hooks are maintained in positions proximate to one another to provide the V-shaped guide;
    wherein the attachment device is installable onto the support by urging the V-shaped guide against the support with sufficient force to overcome the biasing member so that the tips of the hooks rotate away from one another to define sufficient space therebetween for passage of the tips of the hooks past the support, with the biasing member urging the hooks to rotate toward one another after the hooks have passed the support to maintain the attachment device on the support.

5. The device of claim 4 wherein the hub comprises an elongated member.

6. The device of claim 4, wherein the biasing member comprises an elastic member.

7. The device of claim 6, wherein the elastic member comprises one or more elastomeric bands extending around a portion of the hooks.

8. The device of claim 4, further comprising a belay attachment structure connected to the hub.

9. The device of claim 8, wherein the belay attachment structure comprises a U-shaped member connected to the hub and extending in a direction away from the attachment device.

10. The device of claim 4, wherein at least one of the hooks comprises a pair of hook members oriented side by side and spaced apart from one another, and the hook members are maintained in a relative orientation to one another by a rigid connector.

11. The device of claim 10, wherein the rigid connector comprises a weld.

12. The device of claim 4, wherein each of the hooks comprises a pair of hook members oriented side by side and spaced apart from one another, and the hook members are maintained in such orientation to one another by a rigid connector.

13. The device of claim 4, wherein the tips of the hooks are configured to be locatable on opposite sides of the support when the device is installed on the support.

14. An attachment device for installation onto a support, the attachment device comprising:
 a pair of oppositely facing and laterally offset hooks rotatably mounted so as to be oppositely facing and laterally offset from one another;
 a stop defined on one of the hooks and located so that the other one of the hooks is prevented from rotating past the stop by contact with the stop; and
 a biasing member operatively associated with the pair of hooks for urging the hooks to rotate toward one another and the stop limits rotation of the hooks to maintain the pair of hooks relative to one another to facilitate installation of the attachment device onto the support, wherein at least one of the hooks comprises a pair of hook members oriented side by side and spaced apart from one another, and the hook members are maintained in a relative orientation to one another by a rigid connector.

15. The device of claim 14, further comprising a hub onto which the hooks are rotatably mounted.

16. The device of claim 15, further comprising a belay attachment structure connected to the hub.

17. The device of claim 14, wherein the biasing member comprises an elastic member.

18. The device of claim 14, wherein the support comprises a bar and the hooks each have a downward extending tip configured to be locatable on opposite sides of the bar when the device is installed on the support.

\* \* \* \* \*